(12) United States Patent
Anderson et al.

(10) Patent No.: US 8,190,399 B1
(45) Date of Patent: May 29, 2012

(54) HARDWARE AND SOFTWARE USAGE AND CAPACITY INTEGRATION IN ARCHITECTURE BLUEPRINT TOOL AND PROCESS

(75) Inventors: William S. Anderson, Independence, MO (US); Charles L. Micklavzina, Overland Park, KS (US); Haidar Yousif, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1210 days.

(21) Appl. No.: 11/499,150

(22) Filed: Aug. 4, 2006

(51) Int. Cl.
*G06F 17/50* (2006.01)

(52) U.S. Cl. ............................................. 703/1; 703/13

(58) Field of Classification Search .................. 703/1, 6, 703/13; 707/101; 709/223, 220; 717/101, 717/135, 104
See application file for complete search history.

(56) References Cited

U.S. PATENT DOCUMENTS

2006/0064178 A1 * 3/2006 Butterfield et al. ............. 700/18
* cited by examiner

*Primary Examiner* — Kandasamy Thangavelu
*Assistant Examiner* — Luke Osborne

(57) ABSTRACT

A computer implemented method for creating architectural blueprints is provided. The method includes selecting a project, defining the project requirements, and selecting one or more parameters to be used to analyze the project. The method further includes importing the selected parameters, selecting proposed hardware and software combinations capable of meeting the project requirements, and displaying the ramifications of the selected hardware and software. The method also provides for generating architectural blueprints.

17 Claims, 7 Drawing Sheets

HARDWARE AND SOFTWARE USAGE AND CAPACITY INTEGRATION IN ARCHITECTURE BLUEPRINT TOOL AND PROCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The increasing complexity of designing hardware and software architecture blueprints has created a demand for tools that allow for assistance during the design process. Various hardware and software platforms create a wide array of incompatibilities, cost considerations, and other potential concerns that if not identified early in the design phase, can be difficult and expensive to resolve. With the number of hardware and software elements in a network architecture growing rapidly, identifying incompatibilities early in the design phase is becoming crucial to the successful implementation of a design. Therefore, tools that can assist in the design of hardware and software computer networks are becoming increasingly valuable to network architects.

SUMMARY

In one embodiment, a method for creating architectural blueprints is disclosed that includes selecting a project, defining the project requirements, and selecting one or more parameters to be used in the analysis of the project. The method further includes importing the selected parameters, and to selecting proposed hardware and software combinations capable of meeting the project requirements. The method also includes visually displaying the ramifications of the selected hardware and software, and generating architectural blueprints.

In another embodiment, a hardware and software blueprint architecture creation tool is provided that includes a component operable for identifying requirements for a project, and a component operable for identifying hardware and software combinations capable of meeting the requirements of the project. The tool also includes a component to import parameters data, and a component operable for optimizing the hardware and software combinations. A component operable to display the hardware and software combinations, and a component operable for creating an architectural blueprint based upon the selected hardware and software combination are also provided.

In yet another embodiment, a method for creating computer network architectural blueprints is disclosed that includes providing at least one initial parameter data to an architectural creation tool, the architectural creation tool identifying the requirements for a project. The architectural creation tool generates a list of combinations of hardware and software used in a computer network capable of meeting the project requirements. This embodiment further employs an architectural creation tool for displaying a list of ramifications of using each of the combinations of hardware and software. The method also includes selecting a combination of hardware and software, and creating an architecture blueprint from the selected combination.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

One embodiment of the disclosed systems and methods use parameters including, but not limited to, software parameters, hardware parameters, intellectual property parameters, and infrastructure parameters in the design of software and hardware architecture blueprints. The term parameter is intended to include all elements of the group for which the parameter represents (e.g. software parameters is inclusive of all software that is used in conjunction with the software and hardware architecture blueprints). These parameters are inclusive of the current assets available for use in proposed architecture blueprints by the hardware and software architecture creation tool. For instance, if software was available for use in proposed architecture blueprints, the current state of software parameters would reflect the availability of this software.

In one embodiment, an automated system is provided that uses one or more parameters to generate architectural blueprints for a computer network. In this embodiment, the project design requirements are defined and entered into the hardware and software architecture blueprint creation tool.

The hardware and software architecture tool generates blueprints that design a system with hardware and software components which are customized based on parameter information. The blueprints created by the hardware and software architecture tool may include specifications for hardware, software, computer code, and other items required to implement the required system. The hardware and software architecture tool is capable of ascertaining the current state of each parameter, thereby customizing the architecture blueprints for a specific project, as well as optimizing the use of the current state of each parameter. By adding these parameters at an early stage in the architectural design phase, blueprints can be created which will reduce the cost, complexity, and implementation problems while maximizing capacity, expandability, and utilization of existing infrastructure.

Figure 1:
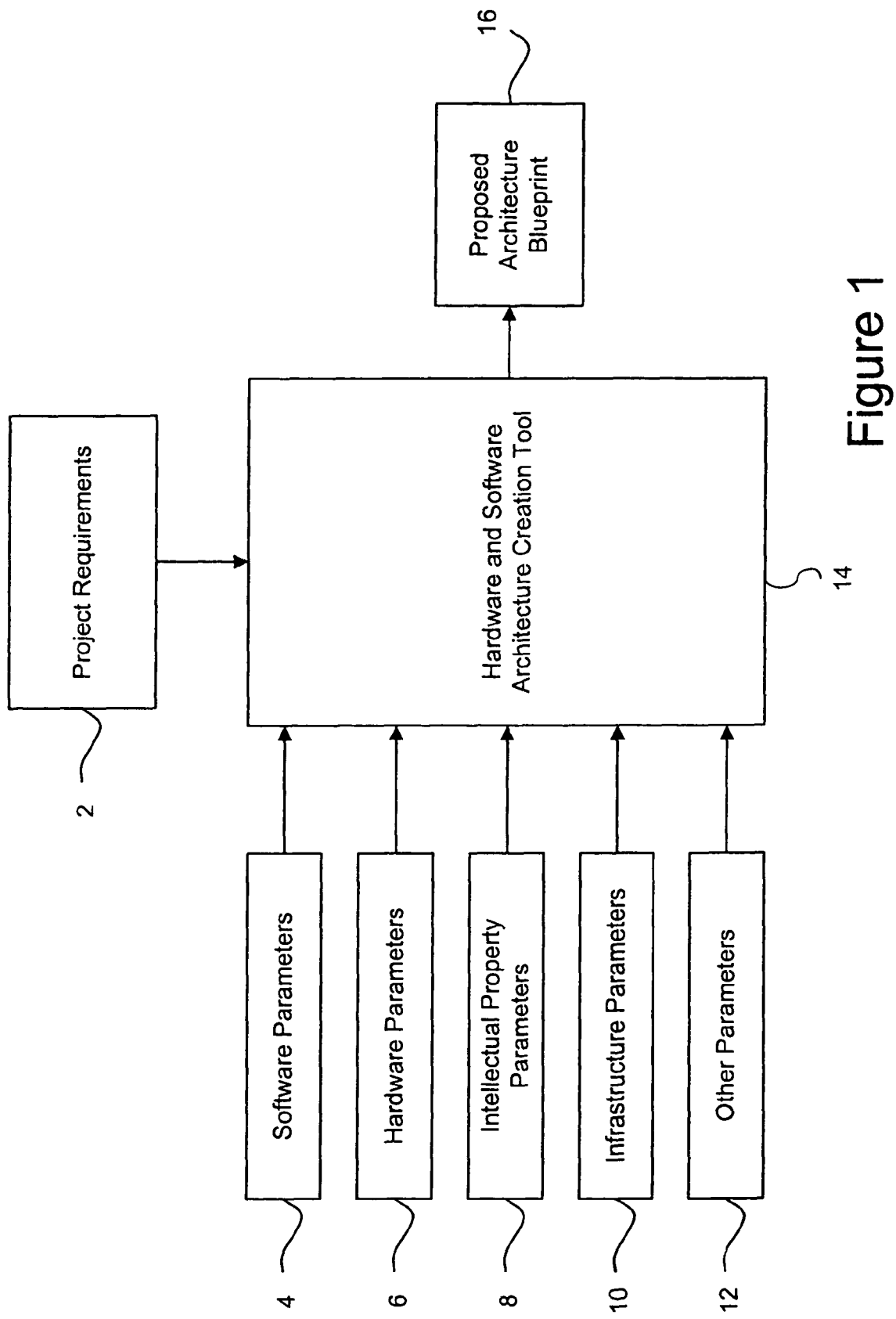
FIG. 1 is a block diagram that depicts an architecture blueprint system according to one embodiment of the present disclosure.

FIG. 1 shows one embodiment of the present disclosure where software parameters 4, hardware parameters 6, intellectual property parameters 8, infrastructure parameters 10, and other parameters 12 are shown being entered into the hardware and software architecture creation tool 14. When a proposed project needs to be designed, project design requirements 2 are defined for a hardware and software network. The hardware and software architecture creation tool 14 is capable of accepting the project design requirements 2 as inputs. The hardware and software architecture creation tool 14 uses various parameters, for example, to generate a set of hardware and software blueprints that meet project requirements while taking into account different parameters, including, but not limited to, the aforementioned parameters.

The hardware and software architecture creation tool 14 may provide in a GUI (graphical user interface) or display the interfaces, payloads, and impacts (e.g. transaction volume, user load, time-of-day information) between hardware and software design choices. The hardware and software architecture creation tool 14 also shows the costs that are associated with the use of the proposed new computer network on existing infrastructure, and the hardware and software usage capacity. The hardware and software architecture creation tool 14 further displays the architectural limitations of the proposed new computer network, such as identifying potential infrastructure bottlenecks, and the incremental costs of adding users or transactions to the computer network. The hardware and software architecture creation tool 14 is capable of taking into consideration any design element that is programmed by the user, and displaying various possible design solutions to the project requirements. The hardware and software architecture creation tool 14 considers the current state of each parameter including, but not limited to, software parameters 4, hardware parameters 6, intellectual property parameters 8, infrastructure parameters 10, and other parameters 12.

A proposed architecture blueprint 16 is created which meets the project requirements by the hardware and software architecture creation tool 14. This proposed architecture blueprint 16 may include information such as the hardware required to implement the blueprints, the software required implementing the blueprints, the computer code required to implement the proposed architecture blueprints 16, and other computer generated material. This proposed architecture blueprint 16 may further be an optimization of the current state of each parameter, thereby utilizing resources already in place prior to the creation of the architecture blueprint 16.

These categories of parameters are intended to be opened ended descriptions of a broad range of different elements that can be entered in to the hardware and software architecture creation tool 14. By way of example, and not limitation, the following parameters are described. Each of the parameters may contain information about other parameters. For instance, the software parameter 4 may also contain information about how other parameters, such as hardware parameters 6, affect both the software parameters 4 capabilities and requirements.

Software parameters 4 are intended to include, but are not limited to, the language of the software available to be used (e.g. Java, C++, c#, Pascal, etc.) as well as the type of product preferred to be created (scripting, precompiled binary, etc.). Software parameters 4 may also include information about the impact of the use of specific software on items such as central processing unit (CPU) requirements, memory requirements, and service requirements. In addition, the software parameters 4 may include information about the capabilities and limitations of certain software, such as database capabilities, transaction capabilities, and concurrent user capabilities.

Hardware parameters 6 are intended to include, but are not limited to, architecture requirements (such as the architecture platform to be used (e.g. x86, 68 k, power, etc.) and specifications and requirements of hardware to be used. These specifications include, but are not limited to, elements of the hardware such as relative processing power, as well as requirements for the hardware, such as power requirements for the processor and the cost of the hardware.

Intellectual property parameters 8 are intended to include, but not be limited to, licensing, patent rights, trademark rights, or any other intellectual property parameters that may impact the efficiency of blueprints generated by the hardware and software architecture creation tool 14. For instance, intellectual property parameters 8 may contain a list of existing software licenses for certain types of products that need to be factored into the creation of architecture blueprints. In addition, this parameter includes information about the incremental costs that are caused by the use of a new or existing network with existing infrastructure.

Infrastructure parameters 10 are intended to include, but not be limited to, existing infrastructure network facilities and existing networking capabilities. Infrastructure parameters 10 also includes current network configuration, types of networks existing, and available bandwidth on the existing networks.

Other parameters 12 are intended to include, but not limited to, all other things that may affect the efficiency of blueprints generated from the hardware and software architecture creation tools 14. These items may include inherent difficulty in finding personnel to implement the hardware or software, variables that will indicate the complexity of the architecture based on hardware and software decisions, and any other factors. Another example of this type of parameters is the anticipated support costs required for different models of hardware and software. The information for this parameter may be derived from empirical data collected with other projects, or anticipates costs based upon calculated estimates. This category is intended to be inclusive of many different types of items, not simply those discussed herein.

Figure 2:
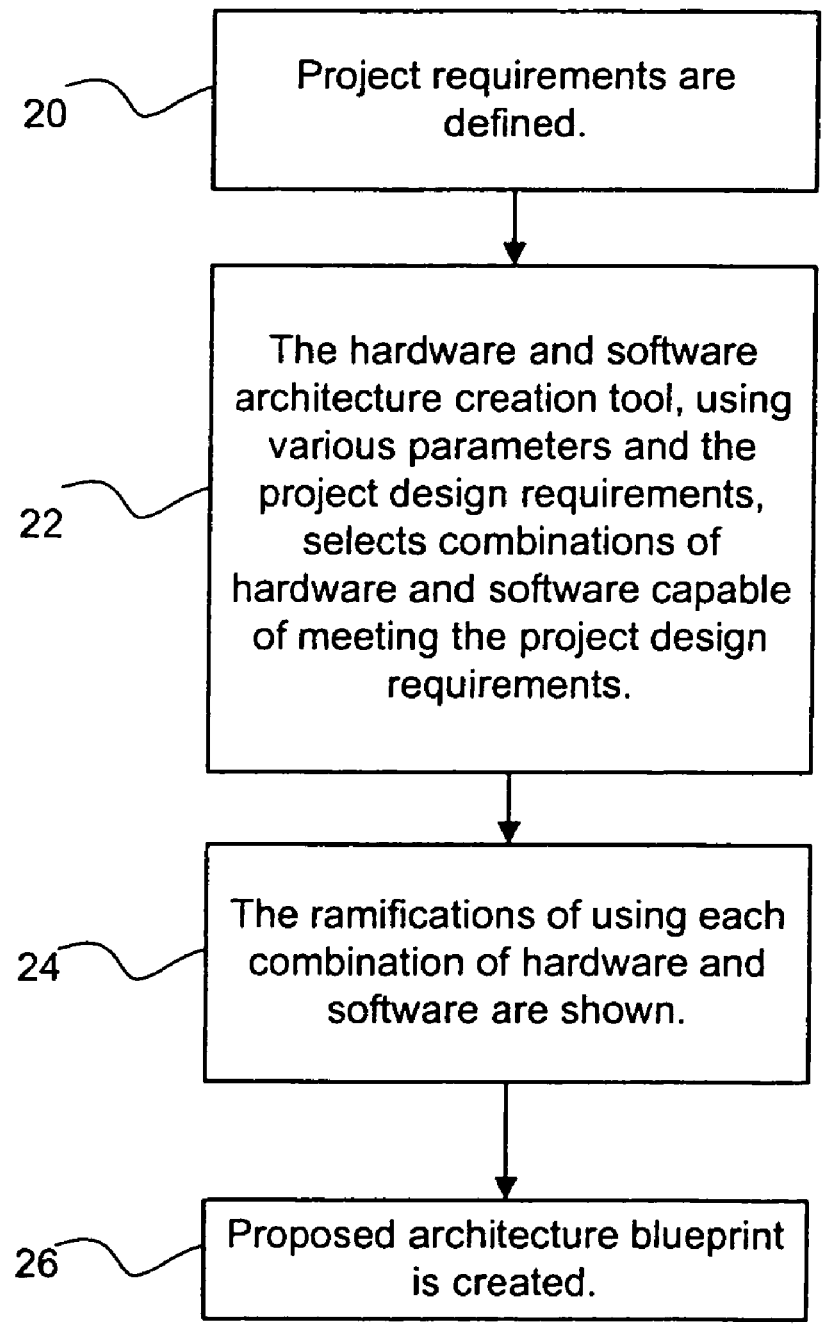
FIG. 2 is a flowchart that depicts one embodiment of parameter analysis according to the present disclosure.

FIG. 2 is an example of an overview of one method that can be used which is consistent with the present disclosure to analyze the impact of certain parameters upon a blueprint. When a project is going to be designed, the project requirements are defined (Block 20). The hardware and software architecture creation tool 14, using various parameters and the project design requirements, selects combinations of hardware and software capable of meeting the project design requirements (Block 22). The ramifications of using each combination of hardware and software are shown (Block 24).

These ramifications include the required database utilization, memory requirements, CPU requirements, and anticipated cost for each combination of hardware and software combination. The term ramification, or ramifications, when used in the context of the selections made by the hardware and software architecture tool 14 is intended to refer to the consequences, including the consequences upon the current state of each parameter, which arise from combinations of hardware and software selections. One feature of the present disclosure is the ability to take into consideration the anticipated support costs and utilization of current assets prior to the creation of the architectural blueprints. After the selection of a combination of the proposed architectural blueprints, the proposed system architecture blueprint is created (Block 26).

Figure 3:
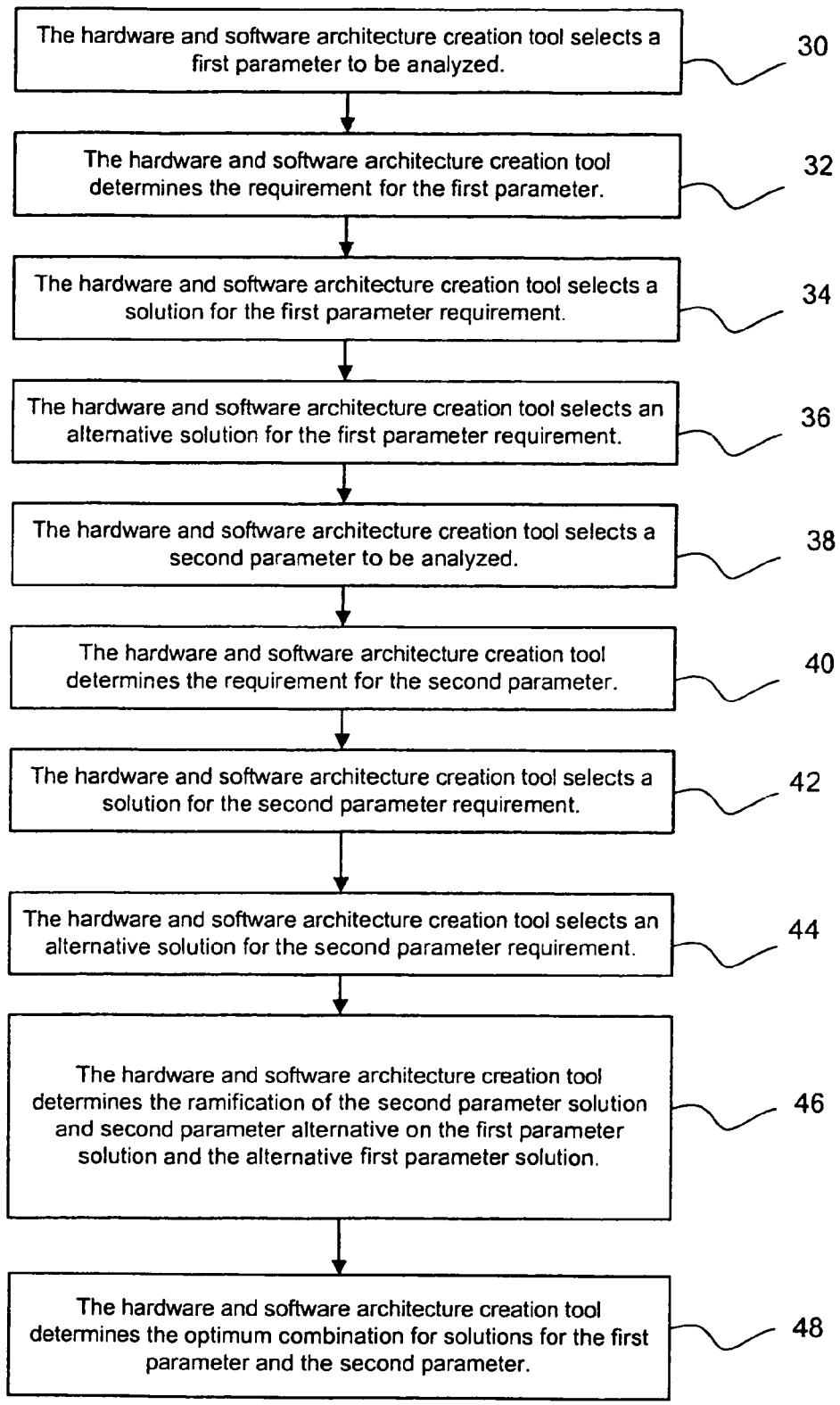
FIG. 3 is a flowchart that depicts one embodiment of parameter analysis according to the present disclosure.

FIG. 3 is an example of one method used to analyze the ramifications of hardware and software decisions by the hardware and software architecture creation tool 14. In one embodiment, the hardware and software architecture creation tool 14 selects a first parameter to be analyzed (Block 30). The first parameter may be any kind of parameter that can be programmed into the hardware and software architecture creation tool 14. The hardware and software architecture creation tool 14 determines the requirement for the first parameter (Block 32). This requirement is based upon the project requirements. The hardware and software architecture creation tool 14 selects a solution for the first parameter requirement (Block 34), and an alternative solution for the first parameter requirement (Block 36). In some situations, it may not be possible to select an alternative solution given the project design requirements. In such an event, the hardware and software blueprint architecture tool 14 will alert the user to the lack of an alternative solution.

Hardware and software architecture creation tool 14 selects a second parameter to be analyzed (Block 38). This second parameter may be any kind of parameter that can be programmed into the hardware and software architecture creation tool 14. Hardware and software architecture creation tool 14 determines the requirement for the second parameter (Block 40). This requirement is based upon the project requirements. Hardware and software architecture creation tool 14 selects a solution for the second parameter requirement (Block 42). Hardware and software architecture creation tool 14 also selects an alternative solution for the second parameter requirement (Block 44). In some situations, it may not be possible to select an alternative solution given the project design requirements. In such an event, the hardware and software blueprint architecture tool 14 will alert the user to the lack of an alternative solution.

Hardware and software architecture creation tool 14 determines the ramification of the second parameter solution and second parameter alternative on the first parameter solution and the alternative first parameter solution (Block 46). Hardware and software architecture creation tool 14 determines the optimum combination for solutions for the first parameter and the second parameter (Block 48). The method for discussing the manner in which the hardware and software architecture creation tool 14 makes the determination of what the optimum solution will be discussed more fully by example below.

The hardware and software architecture creation tool 14 is capable of using any parameter as the first parameter to be analyzed. This allows the user to select a preference for any parameter that may be the most important to the user, or to allow the hardware and software architecture creation tool 14 to create the most efficient blueprint. The use of one, or more parameters, in the following examples should not be construed as limiting the scope of the present disclosure. Any one, or more, parameters as described herein could be used as the first parameter used by the hardware and software blueprint architecture tool 14.

One innovative application of this approach to architecture blueprint creation is the ability to optimize the use of current assets in the creation of proposed architecture blueprints 16, by viewing the current assets known to the hardware and software architecture creation tool 16 for each parameter as the current state of each parameter. For example, the current state of software parameters would include all software currently owned, licensed, or otherwise possessed for use in conjunction with the proposed architecture blueprint 16. The hardware and software architecture creation tool 14 is capable of ascertaining the current state of each parameter, then optimizing the use of available resources. For instance, if a particular operating system is in use, the hardware and software architecture creation tool 14 could generate code that was executable on the operating system in use, thereby, in this example, taking the current state of software parameters 4 into account and optimizing available resources. As another example, the hardware and software architecture creation tool 14 may ascertain that a certain number of licenses of a particular software, such as an operating system, have been purchased or are otherwise available, but are not in use in the organization. Where licenses are a considered parameter, a blueprint may be generated that calls for employing the operating system with the available licenses which reduces expense and otherwise improves efficiency.

Figure 4:
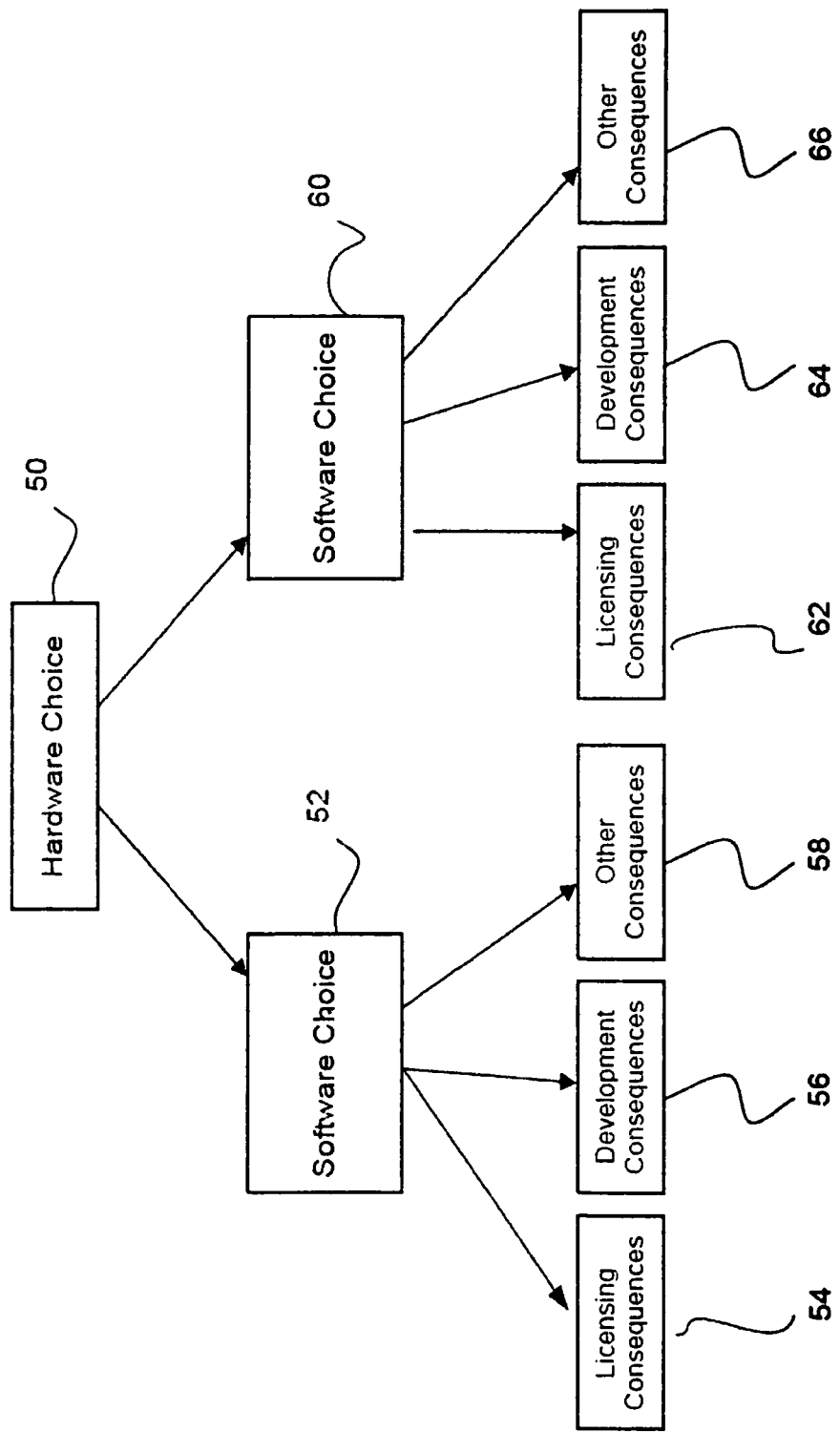
FIG. 4 is a block diagram of one embodiment of the present disclosure beginning with a hardware choice.

FIG. 4 is a block diagram of one decision tree that shows the interrelation of decisions made by one hardware parameter. In this example, the first decision made by the hardware and software architecture creation tool 14 is hardware decision 50. In this example embodiment, the initial hardware choice 50 leads to a decision about the software that can be run on the hardware 50. A first software choice 52 will have specific licensing consequences (e.g., requirements or restrictions on the use of the software) 54, development consequences (e.g., systems and methods capable of developing software for the platform) 56, and other consequences (e.g., impact on other systems, difficulty in implementing, etc.) 58 that will be present as a consequence of the hardware choice 50 and the software choice 52.

If a different software choice 60 is made rather than the previously discussed software choice 52, there will be other, possibly different, consequences. These other consequences may include licensing consequences 62, development consequences 64, or other consequences number 66. The preferred choice of options can be made using an automated system which weighs the respective consequences in light of user choices. For instance, if the relative licensing choice 62 is given a very high weight and the development consequences 64 is given a very small weight, the hardware and software architecture tool 14 will attempt to minimize the licensing consequence 62, even if there is a more significant development consequence 64. The actual numerical weights of these consequences can be defined in either the project requirements 2, by the hardware and software architecture tool 14, or in other ways known to one skilled in the art.

One example of a decision making process that may use a method which first makes a decision based upon hardware is described in the following example. A hardware choice may be made to use Intel x86 processors. Any number of software platforms may run on the hardware, including, but not limited to Microsoft Windows, BSD, and Linux. Each of these software platforms will carry its own set of consequences. For instance, the if Microsoft Windows was used as the software choice 52, there will be specific licensing consequences 54, development consequences 56, and other consequences 58. If Linux was chosen as the software choice 60, there would be a different set of licensing consequences 62, development consequences 64, and other consequences 66.

The ramifications of selecting one combination can then be visually displayed to the user by showing the capabilities of one or more of the available options. For instance, a certain hardware choice may provide a certain number of transactions per hour supporting a certain number of concurrent users, while maintaining a certain level of database, CPU, and memory utilization. In addition, the expenses (e.g., service and support costs, cost of expanding the capability of existing networks, etc.) of selecting one or more of the available options may also be shown.

Figure 5:
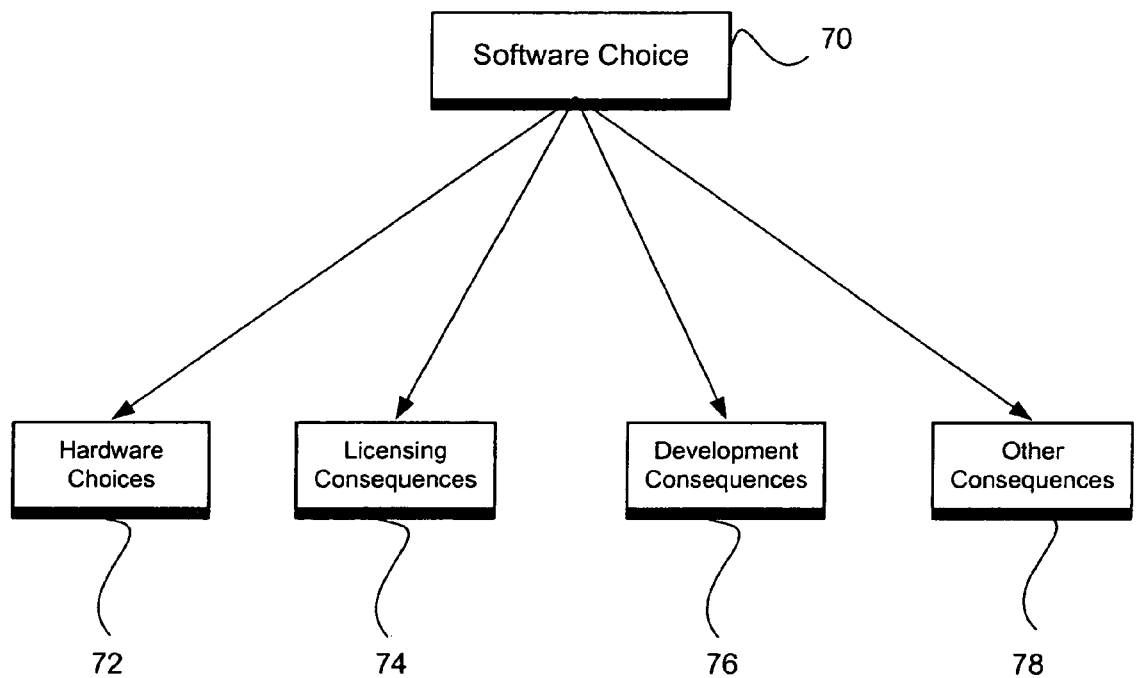
FIG. 5 is a block diagram of one embodiment of the present disclosure beginning with a software choice.

FIG. 5 is a block diagram of the effect of making a software choice prior to making a hardware choice. Hardware choice 72 is dependent upon software choice 70. Hardware choice 72 and software choice 70 in the model illustrated by FIG. 5 are different from hardware choice 50, software choice 52 and software choice 60 illustrated by FIG. 4. This difference arises because the available choices in a model that first evaluates hardware may be different from the available choices if a model first evaluates software.

For instance, if it is required to run a Microsoft exchange server at software choice 70, the hardware choice 72 must be capable of running and supporting the Microsoft operating system. There are also licensing consequences 74, development consequences 76, and other consequences 78 that arise from this choice.

One of the innovative features of the present disclosure is the ability to attempt to find an optimum solution using each parameter as the first decision, depending upon the parameters entered into the hardware and software architecture creation tool 14. For instance, if a client is currently using and wants to continue using particular software, the hardware and software architecture creation tool 14 will attempt to find the best solution or illustrate the relevant relationships that when evaluated will allow administrators to make effective and efficient choices. If a client has particular hardware architecture in place and wants the new system architecture to perform a new function, the hardware and software architecture creation tool 14 will attempt to implement this architecture with the existing hardware. The hardware and software architecture creation tool 14 is capable of looking at various parameters and design requirements to create the architecture blueprint.

Figure 6:
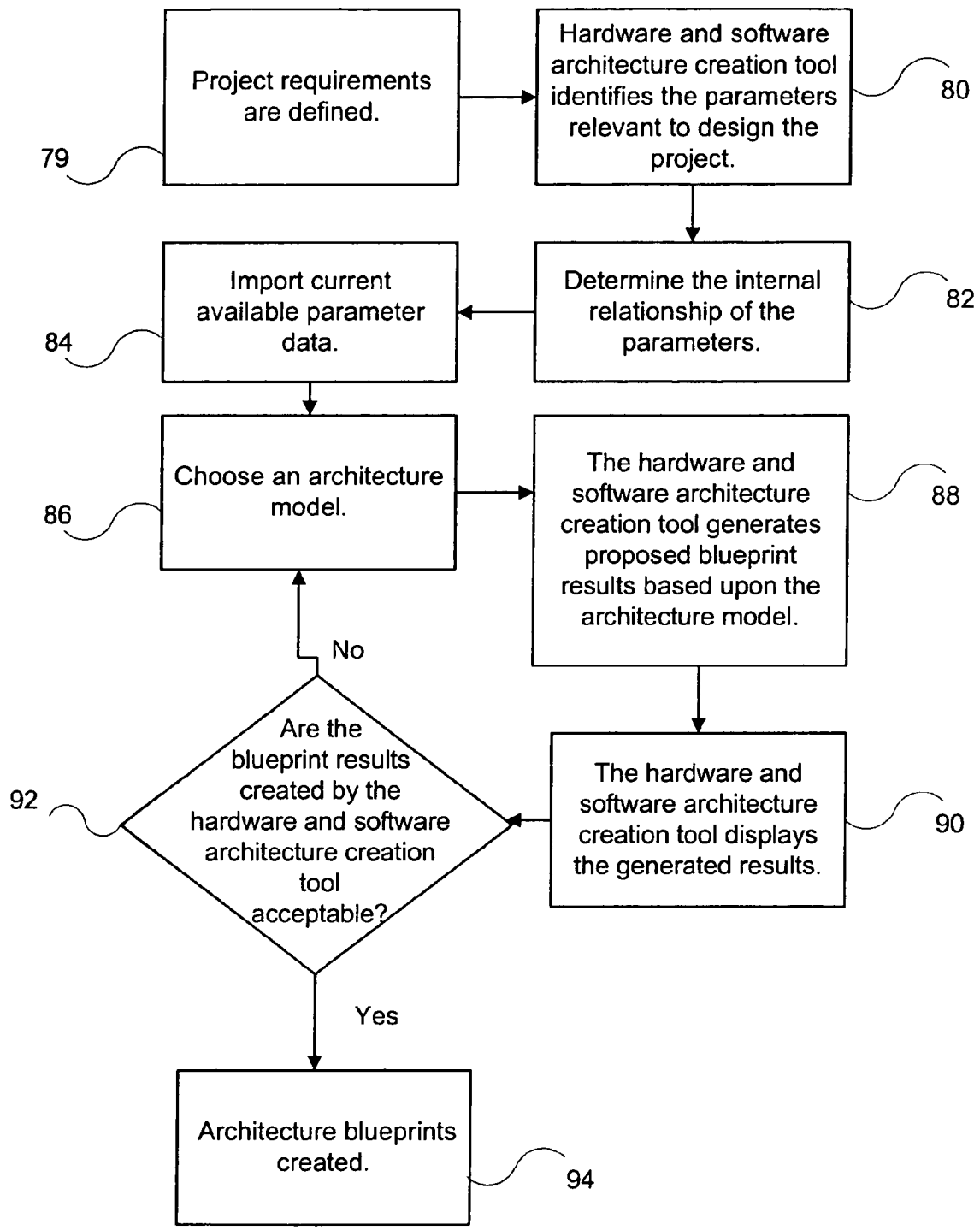
FIG. 6 is a flowchart of creating architecture blueprints as used by one embodiment of the present disclosure.

FIG. 6 is a flow chart of the design process that may be used in one embodiment described by the present disclosure. For a desired hardware and software architectural blueprint, project design requirements are defined (Block 79). The hardware and software architecture creation tool 14 identifies the parameters relevant to design the project (Block 80). The hardware and software architecture creation tool determines the internal relationship of the parameters (Block 82). For instance, certain software parameters may have specific intellectual property requirements, and certain hardware may have specific software requirements.

Hardware and software architecture creation tool 14 will import current available parameter data (Block 84). This data may include, but is not limited to, software parameters 4, hardware parameters 6, intellectual property parameters 8, infrastructure parameters 10, and other parameters 12. The hardware and software architecture creation tool 14 applies an architecture model (Block 86). The architecture model may be user defined, or forced by a particular preference. For instance, the user may want to find the lowest cost model while using existing hardware. Another user may want to use a specific software package. The hardware and software architecture creation tool 14 will use the parameters that are given by the user to customize the architectural blueprints.

Based on these parameters, the hardware and software architecture creation tool 14 generates a blueprint based upon the architecture model (Block 88). After the blueprints have been generated, the hardware and software architecture creation tool 14 displays the generated proposed blueprint results (Block 90). These results may include, but are not limited to, generated computer code, listing of required hardware, estimated cost of hardware, estimated cost of software, incremental cost of the new network on the existing infrastructure, the relative level of complexity of implementation as determined by the architectural model, utilization of existing parameters, or any other desired result. In addition, the generated blueprint results visually identify the required interfaces, predicted payloads, and the impact of implementing the proposed blueprints. This impact is used to identify potential problems, such as infrastructure bottlenecks, prior to the implementation of the blueprints so as to allow altering the blueprints or acquiring additional infrastructure. In this way, the proposed blueprints can estimate future capacity and network utilization, as well as to identify and plan for the acquisition of hardware, software, and other infrastructure items. The hardware and software architecture creation tool 14 can also estimate anticipated total cost of implementing the blueprints by summing all of the costs known to the hardware and software architecture creation tool 14. These costs may be monetary (e.g. the total cost of hardware, licenses, and support agreements to be purchased), or user assigned (e.g. user defines a preference and a value to the parameter, and the hardware and software determines the best solution by summing the user defined values).

The user decides if the blueprints created by the hardware and software architecture creation tool 14 are acceptable (Block 92). If the user finds the proposed blueprints are acceptable, the architecture blueprints are created (Block 94). If the user finds the proposed blueprints unacceptable, a different architecture model is chosen (Block 86), and the process of creating the blueprints continues.

Figure 7:
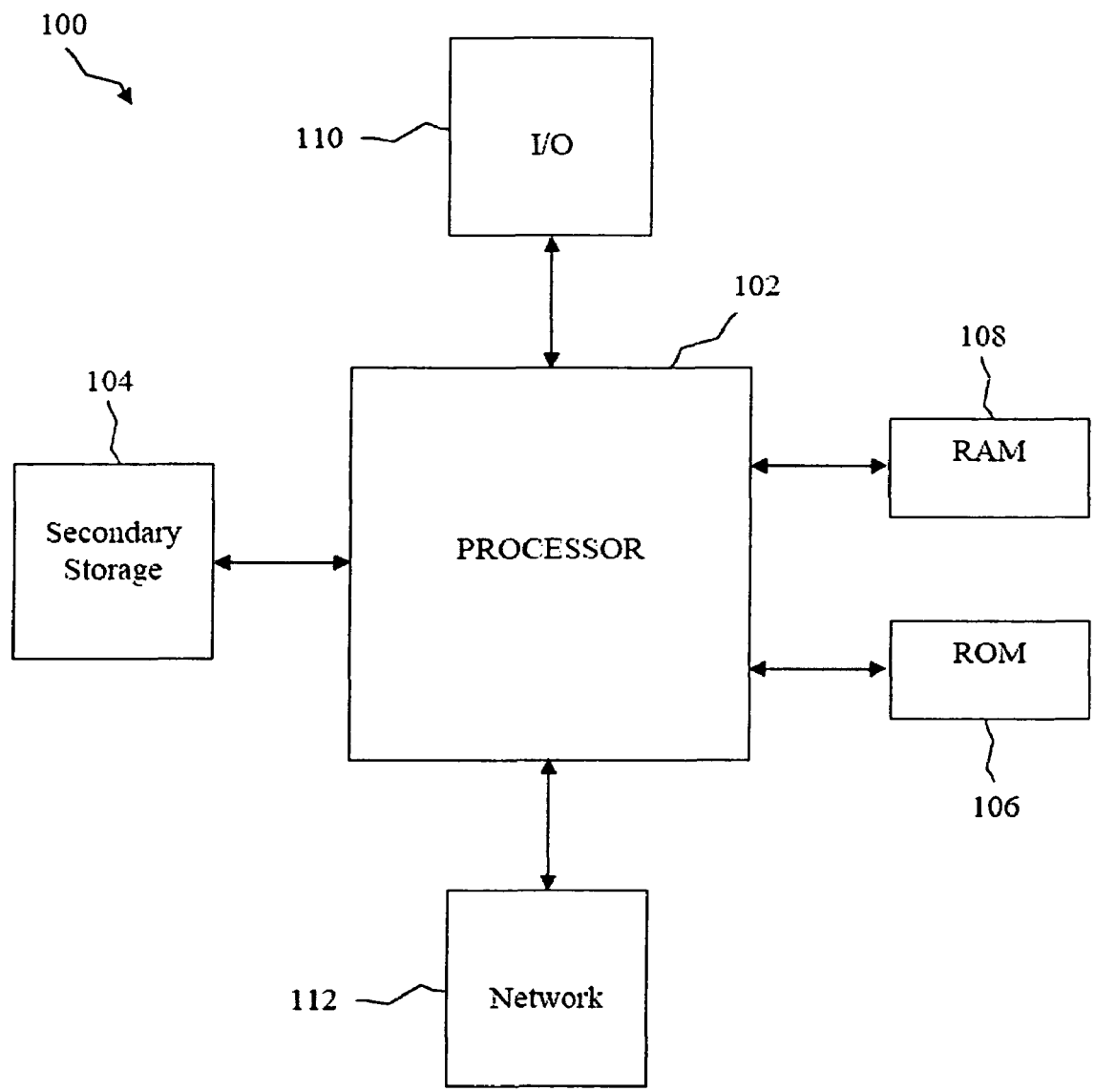
FIG. 7 illustrates an exemplary general-purpose computer system suitable for implementing several embodiments of the disclosure.

When implemented on a computer, the system described above may be implemented on any device with sufficient processing power, memory resources, and network throughput capability to handle the necessary workload placed upon it. FIG. 7 illustrates a typical, general-purpose computer system suitable for implementing one or more embodiments of the hardware and software architecture tool disclosed herein. The computer system 100 includes a processor 102 (which may be referred to as a central processor unit or CPU) that is in communication with memory devices including secondary storage 104, read only memory (ROM) 106, random access memory (RAM) 108, input/output (I/O) 110 devices, and network connectivity devices 112. The processor may be implemented as one or more CPU chips.

The secondary storage 104 is typically comprised of one or more disk drives or tape drives and is used for non-volatile storage of data and as an over-flow data storage device if RAM 108 is not large enough to hold all working data. Secondary storage 104 may be used to store programs which are loaded into RAM 108 when such programs are selected for execution. The ROM 106 is used to store instructions and perhaps data which are read during program execution. ROM 106 is a non-volatile memory device which typically has a small memory capacity relative to the larger memory capacity of secondary storage. The RAM 108 is used to store volatile data and perhaps to store instructions. Access to both ROM 106 and RAM 108 is typically faster than to secondary storage 104.

I/O 110 devices may include printers, video monitors, liquid crystal displays (LCDs), touch screen displays, keyboards, keypads, switches, dials, mice, track balls, voice recognizers, card readers, paper tape readers, or other well-known input devices. Most general purpose computers are driven using a mouse, or pointer, based navigation system.

The network connectivity devices 112 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 112 devices may enable the processor 102 to communicate with an Internet or one or more intranets. With such a network connection, it is contemplated that the processor 102 might receive information from the network, or might output information to the network in the course of performing the above-described method steps. Such information, which is often represented as a sequence of instructions to be executed using processor 102, may be received from and outputted to the network, for example, in the form of a computer data signal embodied in a carrier wave Such information, which may include data or instructions to be executed using processor 102 for example, may be received from and outputted to the network, for example, in the form of a computer data baseband signal or signal embodied in a carrier wave. The baseband signal or signal embodied in the carrier wave generated by the network connectivity 112 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 102 executes instructions, codes, computer programs, scripts which it accesses from hard disk, floppy disk, optical disk (these various disk based systems may all be considered secondary storage 104), ROM 106, RAM 108, or the network connectivity devices 112.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for creating architectural blueprints for a new computer network project, comprising:

providing a set of parameters to analyze the new computer network project, wherein the set of parameters includes software parameters, hardware parameters, intellectual property parameters, and existing network infrastructure parameters, wherein the software parameters comprise information about at least one of software capabilities, software interrelationships, software dependencies, database capabilities, transaction capabilities, and concurrent user capabilities;

wherein the hardware parameters comprise information about at least one of hardware specifications, hardware requirements, cost of the hardware, power requirements of the hardware, processing power, and architecture platform;

wherein the intellectual property parameters comprise information about at least one of patent rights, licensing, trademarks rights, and incremental costs caused by the use of a new or existing network with existing infrastructure; and wherein the infrastructure parameters comprise information about at least one of existing infrastructure network facilities, existing networking capabilities, a current network configuration, types of networks existing, and available bandwidth on the existing networks;

defining project requirements for the new computer network project by providing values for at least one of the parameters from the set of parameters;

importing current data for the existing network infrastructure parameters;

determining and displaying at least one option for the new computer network project based on the defined project requirements and the imported current data for the existing network infrastructure parameter, wherein each option corresponds to a different combination of values for the software parameters, the hardware parameters, the intellectual property parameters, and the existing network infrastructure parameters;

determining and displaying parameter-specific consequences corresponding to the set of parameters for each option; and generating an architectural blueprint for at least one determined and displayed option for the new computer network project upon request.

2. The method of claim 1, wherein said determining and displaying at least one option for the new computer network project comprises determining and displaying a preferred option in which values for the hardware parameters are selected before values for the software parameters are selected.

3. The method of claim 1, wherein the consequences include cost, complexity, and support requirements for each hardware and software combination corresponding to each option of the new computer network project.

4. The method of claim 1, wherein determining and displaying at least one option comprises determining and displaying an option for the new computer network project that optimizes utilization of an existing network infrastructure represented by the existing network infrastructure parameter.

5. The method of claim 1, wherein the architectural blueprint contains source code of software required to implement the architectural blueprint.

6. The method of claim 1, wherein received values for the at least one parameter of the set of parameters is not related to hardware or software.

7. A hardware and software blueprint architecture creation tool, comprising:
a processor configured to:
identify requirements for a new computer network project based on a set of parameters including software parameters, hardware parameters, intellectual property parameters, and existing network infrastructure parameters; identify options for the new computer network project by selecting values for the hardware parameters and the software parameters to meet the identified requirements of the new computer network project;
import current data for the existing network infrastructure parameters,
wherein the software parameters comprise information about at least one of software capabilities, software interrelationships, software dependencies, database capabilities, transaction capabilities, and concurrent user capabilities;
wherein the hardware parameters comprise information about at least one of hardware specifications, hardware requirements, cost of the hardware, power requirements of the hardware, processing power, and architecture platform;
wherein the intellectual property parameters comprise information about at least one of patent rights, licensing, trademarks rights, and incremental costs caused by the use of a new or existing network with existing infrastructure; and
wherein the infrastructure parameters comprise information about at least one of existing infrastructure network facilities, existing networking capabilities, a current network configuration, types of networks existing, and available bandwidth on the existing networks;
determine values for the hardware parameters and the software parameters for at least one option of the new computer network project based on the identified requirements and the imported current data for the existing network infrastructure parameters;
determine parameter-specific ramifications corresponding to the set of parameters for each option;
display each option and the parameter-specific ramifications for each option;
choose one of the identified options for the new computer network project; and
create an architectural blueprint based upon the chosen option for the new computer network project.

8. The blueprint architecture creation tool of claim 7, wherein the processor is further configured to fix a value of at least one of the parameters from the set of parameters based on user input and to adjust values of other parameters from the set of parameters.

9. The blueprint architecture creation tool of claim 7, wherein the processor is further configured to generate a schedule of software, hardware, and infrastructure acquisitions anticipated by the blueprint architecture creation tool.

10. The blueprint architecture creation tool of claim 7, wherein the processor is configured to choose one of the identified options for the new computer network project based on a preference that values for the software parameters be selected before values for the hardware parameters.

11. A method for creating computer network architectural blueprints through an architectural creation tool, the method comprising:
receiving values for at least one initial parameter in a set of parameters related to a new computer network project, wherein the set of parameters comprises software parameters, hardware parameters, intellectual property parameters, and existing infrastructure parameters,
wherein the software parameters comprise information about at least one of software capabilities, software interrelationships, software dependencies, database capabilities, transaction capabilities, and concurrent user capabilities;
wherein the hardware parameters comprise information about at least one of hardware specifications, hardware requirements, cost of the hardware, power requirements of the hardware, processing power, and architecture platform;
wherein the intellectual property parameters comprise information about at least one of patent rights, licensing, trademarks rights, and incremental costs caused by the use of a new or existing network with existing infrastructure; and
wherein the existing infrastructure parameters comprise information about at least one of existing infrastructure network facilities, existing networking capabilities, a current network configuration, types of networks existing, and available bandwidth on the existing networks;
identifying the received values for the at least one initial parameter in the set of parameters as a requirement for the new computer network project;
generating a list of combinations of hardware and software capable of meeting the requirements for the new computer network project;
displaying a list of ramifications of using each of the combinations of hardware and software wherein the ramifications include consequences upon a current state of the existing network infrastructure parameters;
selecting a combination of hardware and software from the list of combinations of hardware and software; and
creating an architecture blueprint from the selected combination.

12. The method of claim 11, wherein the combination of hardware and software is selected based upon a defined preference by the architecture creation tool, where hardware is selected before software.

13. The method of claim 11, wherein hardware includes both server and client hardware.

14. The method of claim 11, wherein the ramifications also include the implementation and support cost of the listed combination.

15. The method of claim 11, wherein the architectural creation tool determines a relationship between different parameters of the set of parameters, and displays the ramifications of the hardware and software combinations for each parameter of the set of parameters.

16. The method of claim 11, wherein the anticipated total cost for each combination of hardware and software listed is determined by summing all anticipated costs and the selection of the hardware and software combination is preformed on the basis of the least expensive combination.

17. The method of claim 11, wherein each of the combinations of hardware and software provide a different solution for meeting the requirements for the new computer network project.

\* \* \* \* \*